(12) United States Patent
Mascari

(10) Patent No.: US 6,419,253 B1
(45) Date of Patent: Jul. 16, 2002

(54) WHEELCHAIR HAVING A DOUBLE TURNBUCKLE HEIGHT ADJUSTMENT

(75) Inventor: Nick Mascari, Newburg Heights, OH (US)

(73) Assignee: Invacare Corporation, Elyria, OH (US)

( * ) Notice: Subject to any disclaimer, the term of this patent is extended or adjusted under 35 U.S.C. 154(b) by 0 days.

(21) Appl. No.: 09/563,045

(22) Filed: May 1, 2000

(51) Int. Cl.[7] .................................................. B62M 1/14
(52) U.S. Cl. ..................................................... 280/250.1
(58) Field of Search ........................... 250/250.1, 304.1, 250/650.1

(56) References Cited

U.S. PATENT DOCUMENTS

| | | | | |
|---|---|---|---|---|
| 3,103,384 A | * | 9/1963 | Zivi | 280/30 |
| 3,887,228 A | * | 6/1975 | Ingerson | |
| 4,553,770 A | * | 11/1985 | Lyman | |
| 4,802,683 A | * | 2/1989 | Gillum, Sr. | 280/304.1 |
| 5,165,137 A | * | 11/1992 | Amrein et al. | 403/43 |
| 5,513,867 A | * | 5/1996 | Bloswick et al. | |
| 5,718,442 A | * | 2/1998 | Alexander et al. | |

FOREIGN PATENT DOCUMENTS

| | | | | |
|---|---|---|---|---|
| DE | 4435023 A1 | * | 3/1996 | A47C/3/00 |
| EP | 302981 A1 | * | 2/1989 | B61D/7/28 |

* cited by examiner

*Primary Examiner*—Kevin Hurley
(74) *Attorney, Agent, or Firm*—Hudak & Shunk Co. L.P.A.; Laura F. Shunk

(57) ABSTRACT

A wheelchair is provided which has a seat height adjustment comprised of a in-line turnbuckle that allows infinite adjustment of the length of a turnbuckle assembly. The assembly includes a handgrip with a longitudinal recess having a first end with smaller internal threads that mate with the external threads of a smaller diameter cylinder. This cylinder can telescope with a recess formed in a second hollow cylinder having oppositely threaded external threads that mates with a second larger diameter set of threads in a second end of the longitudinal recess of the handgrip. The smaller diameter cylinder includes a snap button on a spring, which catches an annular shoulder on the recess formed at the transition between the smaller and the larger diameter areas. This inhibits the turnbuckle from over-extension. Further, the assembly has a restraint, which inhibits the turnbuckle assembly from working out of its selected position during use. The restraint can be pop detent or jam nut. The turnbuckle assembly is pivotally mounted at both ends in brackets, which are fastened respectively to a seat frame member and to a cross frame member.

20 Claims, 4 Drawing Sheets

WHEELCHAIR HAVING A DOUBLE TURNBUCKLE HEIGHT ADJUSTMENT

The invention relates to a wheelchair having a turnbuckle assembly that acts in compression to maintain an adjustable height and angle of the seat relative to the drive axle.

BACKGROUND OF THE INVENTION

It is an advantage to provide for a mechanism for height and seat angle adjustment for wheelchairs that allows easy use but can be locked into a desired position, which will be sustained during even the most active use of the wheelchair. The present invention presents an elegant design solution, which is suitable in particular for the demands of high performance wheelchairs.

The healthcare industry has become increasingly aware of the need of wheelchairs users who are vigorous and athletic despite their confinement to wheelchairs. The aesthetic of high performance wheelchairs corresponds to that of high performance bicycles. The equipment is designed to be lightweight but strong and facile so that the user feels that it is an extension of his or her own body. The paradigm of more from less provides for structures and mechanisms that are deceptively simple and elegant solutions to the problems presented. The present invention provides such an elegant solution to height adjustment, giving a maximum range of adjustment which is easily manipulated but which will stand up to even the most rigorous use. Of course, the invention can also be used on wheelchairs, which are deigned for regular use criteria, such as institutional manual chairs, and even power chairs.

The present invention utilizes a telescoping "single handle in line" turnbuckle assembly which has a small diameter right hand screw cylinder attached to the seat frame and that telescopes into a larger hollow left hand screw cylinder attached to a crossbar member of the frame of the wheelchair. A hand grasp has an internal bore along its longitudinal axis, which has threads at one end that mate with the larger diameter cylinder threads. The other end has a restricted opening, which includes smaller diameter threads that mate with the smaller diameter cylinder. The bore has an internal shoulder area, which acts in concert with a snap button having a detent member that projects radially outwardly from the smaller diameter cylinder to stop the cylinder from being unscrewed from the turnbuckle assembly. Further, a locking mechanism, such as a jam nut or a pop lock, which springs into a seat, such as a groove in one of the sets of threads, maintains the set relationship of the two cylinders. The rearward cylinder is pivotally joined to the seat frame member. For example, the cylinder may be welded to a transverse tube, which captures opposing pivot pins that pivotally secure the tube to spaced bracket members attached to the seat frame rod. Thus, the transverse tube will pivot in relation to the seat frame member to allow for the change in angle as the turnbuckle is extended or contracted by rotation of the handgrip. A similar pivot assembly is provided for the cross frame member.

The present invention provides infinite adjustment over its range, an extended range of motion for a relatively small radial change in the hand grip, locking mechanisms to provide for a secured setting and to prohibit over-extension of the telescoping members, and an economically efficient and structurally elegant tight method of achieving seat height adjustment.

DETAILED DESCRIPTION OF THE DRAWINGS

Figure 1:
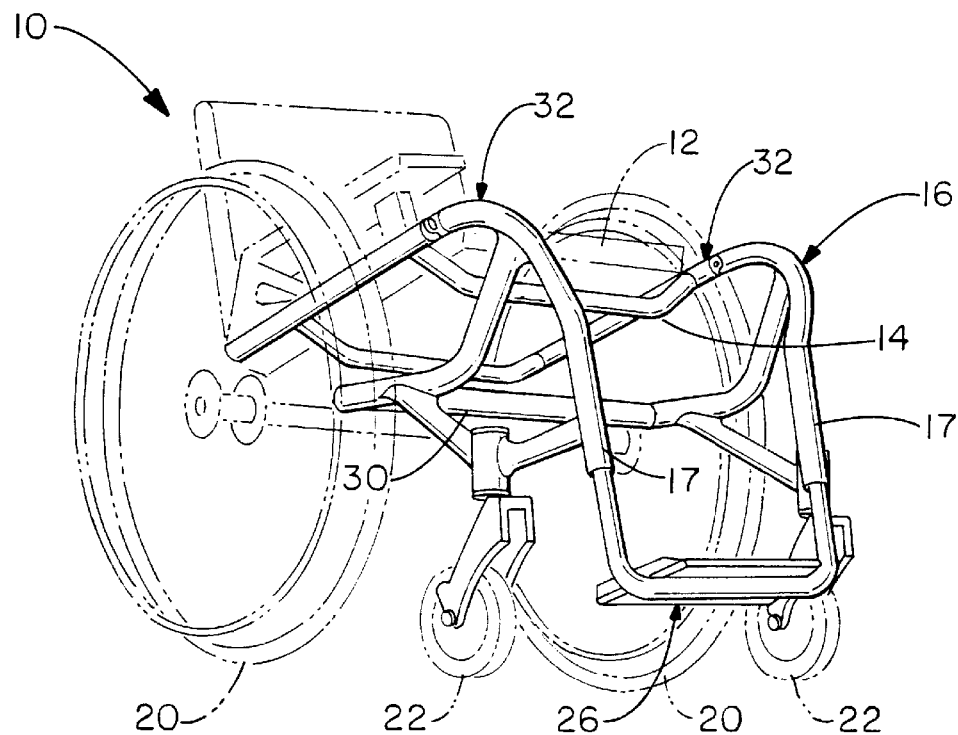
FIG. 1 is a front perspective view of a wheel chair with the height adjustment assembly of the present invention.
Figure 2:
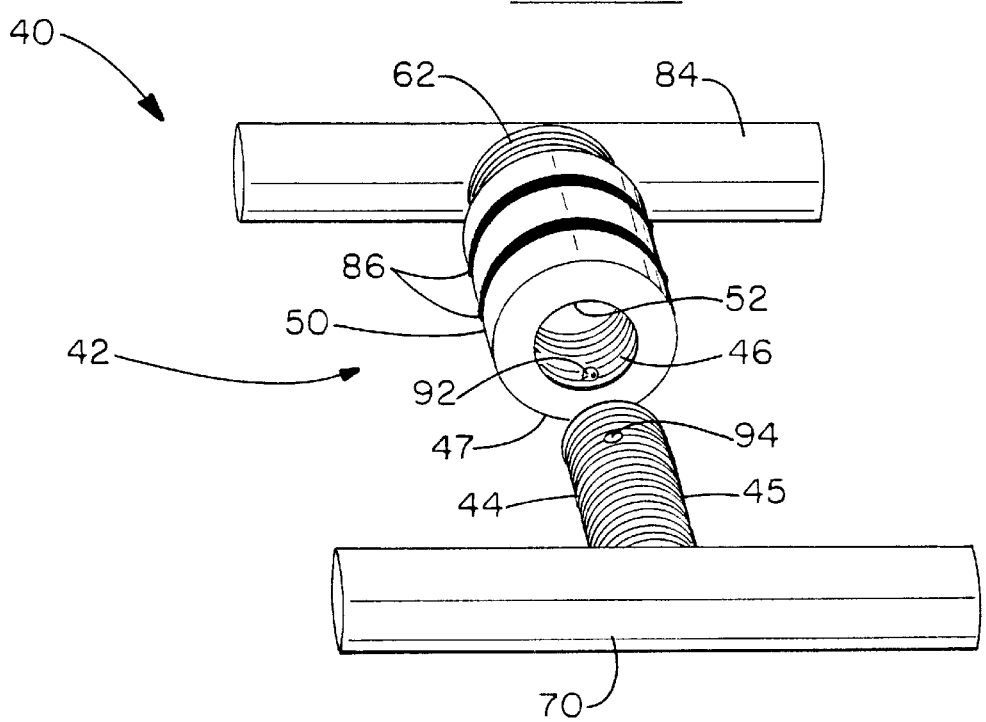
FIG. 2 is a top perspective view of the turnbuckle assembly members of a first embodiment of the invention.
Figure 3:
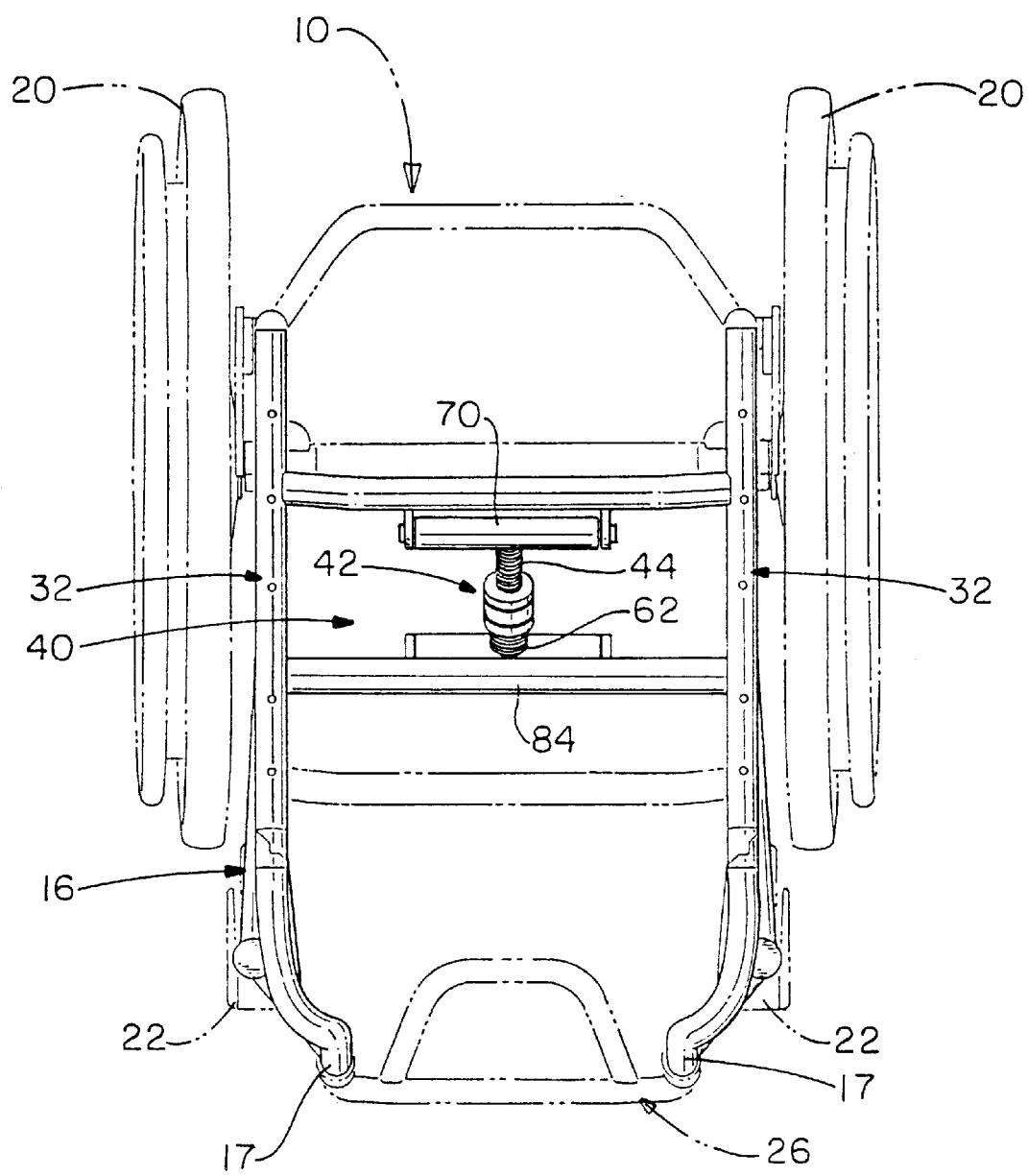
FIG. 3 is a top view of the wheelchair of FIG. 1.
Figure 4:
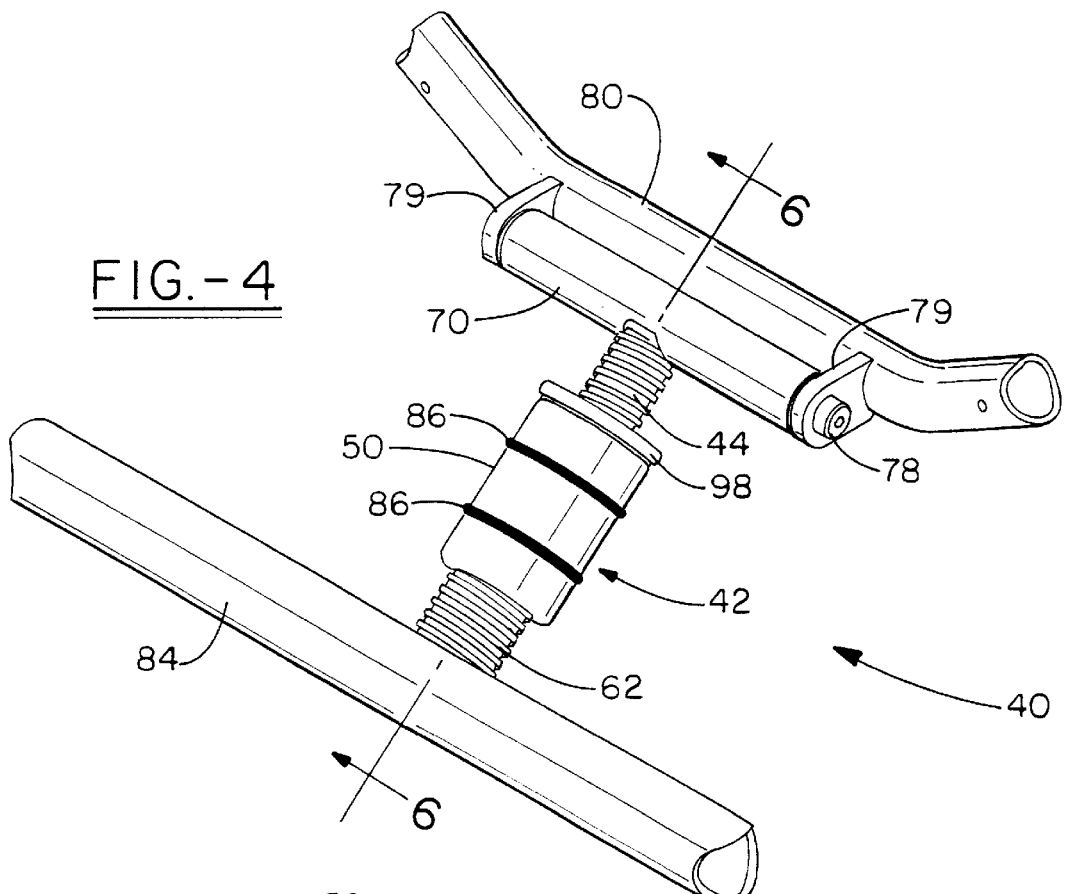
FIG. 4 is a top perspective view of a second embodiment of the height adjustment assembly.
Figure 6:
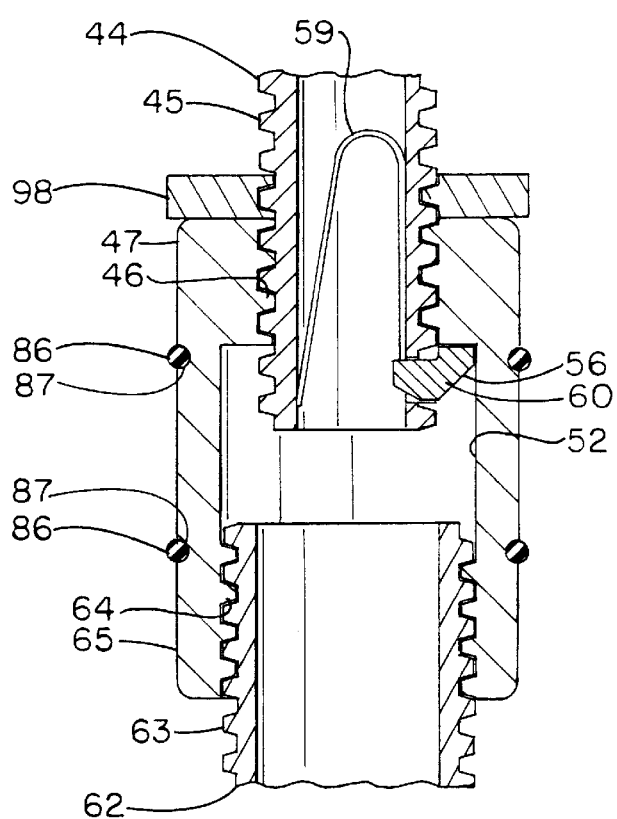
FIG. 6 is an enlarged cross sectional view of the double in-line turnbuckle taken along line 6—6 of FIG. 4.
Figure 5:
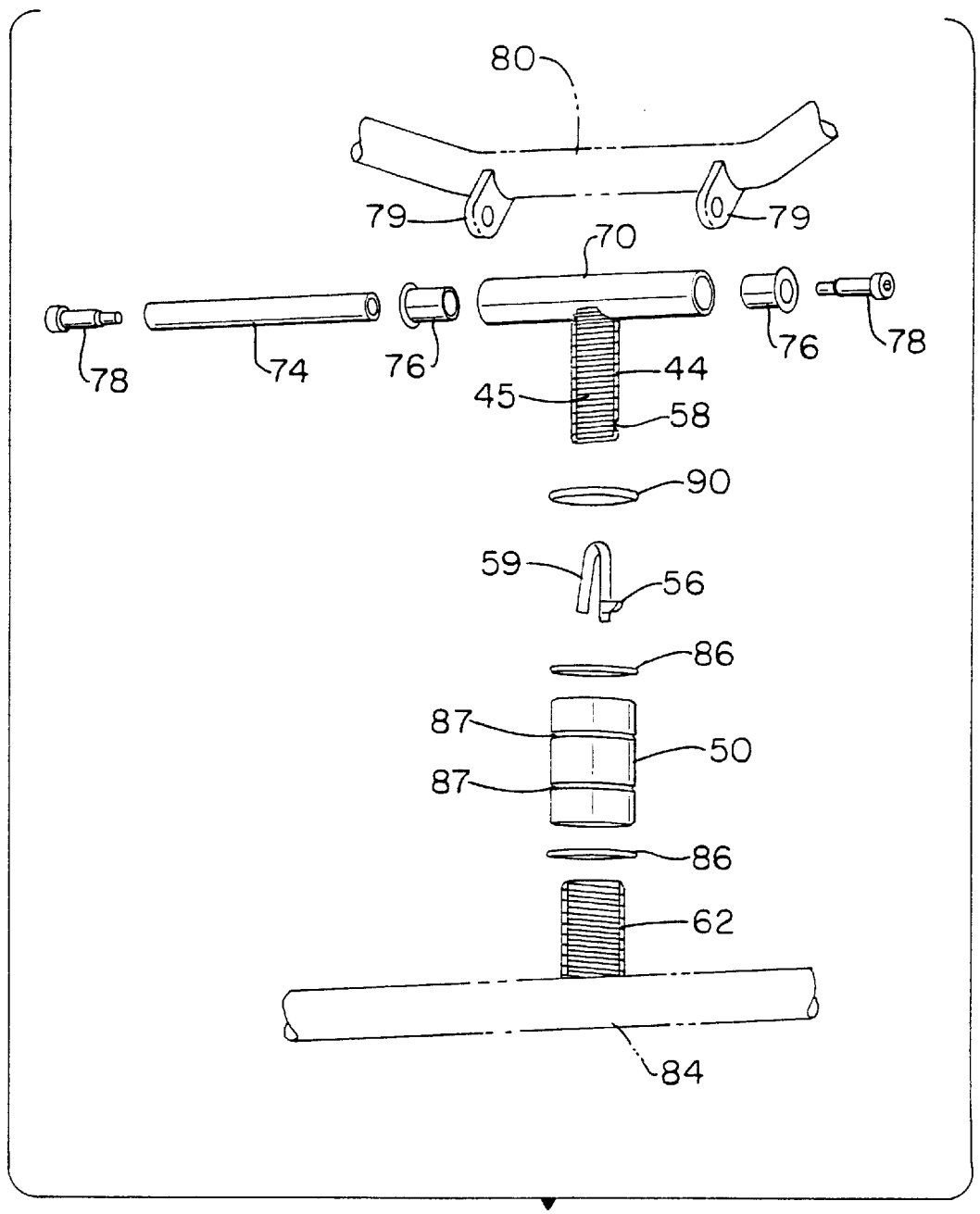
FIG. 5 is a top exploded assembly view of FIG. 4.

A manual wheelchair is shown in FIG. 1 and includes a seat assembly 10 having a seat support 12 suspended from a seat frame assembly 14 which forms a portion of the larger wheelchair frame assembly 16. The frame assembly is carried by a pair of drive wheels 20 having an axle which supports the frame assembly 16 relative to the ground. In the front, the wheelchair has a pair of castor wheels 22 which hold the lower front frame members 17. A footrest assembly 26 is supported in the front lower space between the castor wheels 22. A crossbar 30 extends between two side frame members 32 each substantially disposed in their own vertical plane.

The height adjustment assembly 40 in accordance with the present invention includes an in-line turnbuckle member 42 which is comprised of a small diameter cylinder 44 having a first set of threads 45 that mate with a corresponding set of threads 46 in a first end 47 of the hand grip 50. The cylindrical handgrip includes a longitudinal recess 52, which is threaded with smaller diameter thread at one end and larger diameter threads at the other end. The transition between the smaller and the larger diameter threads forms an annular shouldered area 54 which serves as a stop for an opposing surface of a snap button 56. The snap button 56 projects radially outwardly through a hole 58 in the small diameter cylinder 44. A spring member 59 biases it outwardly and retains it in position in the cylinder 44. The snap button also has a cam surface 60, which causes it to retract when it encounters the second cylindrical member 62 and telescopes within it.

The second cylindrical member 62 also includes threads 63 which mate with corresponding larger diameter threads 64 in the second end 65 of the recess 52. The first and the second set of threads are in opposite direction, i.e. left and right, so that when the handgrip is rotated, the first and the second cylinders are respectively drawn together or apart. The first cylinder is fixed to a transverse bar 70 which houses a pivot assembly 72 comprising an inner rod 74 which is held in position in flanged members 76 secured by pivot pins 78 in spaced brackets 79 that extend outwardly from bottom seat frame crossbar 80. A similar pivot assembly 82 secures a second transverse bar 84, which is fixed to the second cylinder 62 of the turnbuckle assembly. In order to provide for an optimal look and feel, the handgrip includes resilient o-ring members 86 which are seated in grooves 87 of the handgrip.

The turnbuckle assembly further includes a locking mechanism 90 which holds the assembly at the set range. In the first embodiment, the locking mechanism 90 is a pop lock comprised of a spring biased ball detent 92 which is biases outwardly by a spring (not shown) so that the ball rides against the surface of the cylinder until it encounters the groove 94 where it pops into a locked position which opposes unscrewing of the turnbuckle assembly. Continued rotation of the handgrip can overcome the locking force so that the turnbuckle assembly can be repositioned into an alternate setting. A set screw can be used to tighten down the assembly into a position where it is no longer adjustable without loosening the set screw. In a second embodiment, the locking mechanism is provided by a jam nut 98, which opposes the unscrewing of the assembly during use.

While the preferred mode of the invention has been set forth, it should be understood that the description is illustrative and the scope of the invention is not intended to be limited to the specifics set forth herein.

What is claimed is:

1. A wheelchair having a drive axle and a frame assembly which supports a seat at an adjustable height relative to the drive axle and wherein the height adjustment is provided by a turnbuckle assembly which acts in compression to accept a downward loading from the seat.

2. A wheelchair as set forth in claim 1 wherein said wheelchair has a frame assembly including a seat frame and a cross bar and the turnbuckle assembly is a double in line turnbuckle assembly which is pivotally connected to the seat frame and the cross bar and adjustably defines the distance between them.

3. A wheelchair as set forth in claim 2 wherein said turnbuckle comprises first and second cylindrical members in co-axial relation to each other.

4. A wheelchair as set forth in 3 wherein the first cylindrical member includes a first set of threads and the second cylindrical member includes a second set of threads and the turnbuckle assembly further includes a hand grip having a longitudinal recess that has a first end having a first set of internal threads and a second end having a second set of internal threads which mate respectively with the first and second set of threads of the first and second cylindrical members.

5. A wheelchair as set forth in claim 4 wherein the first and second sets of threads are opposite threads whereby the first and second cylindrical members are drawn together or pushed apart when the handgrip is rotated.

6. A wheelchair as set forth in claim 5 wherein the turnbuckle assembly further includes a safety that prohibits the cylindrical members from being overextended.

7. A wheelchair as set forth in claim 6 wherein the safety is a snap button which projects radially outward from the smaller diameter cylinder.

8. A wheelchair as set forth in claim 7 wherein the handgrip includes a longitudinal recess which includes the first and second threads and one of the set of threads has a smaller diameter so that a transition area between the first and the second set of threads forms an annular shoulder that mates with the snap button to form a stop.

9. A wheelchair as set forth in claim 8 wherein the snap button has a cammed surface that is biased inward when the smaller diameter cylinder telescopes inside of the larger diameter cylinder.

10. A wheelchair as set forth in claim 9 further including a locking mechanism that resists forces tending to move the first and second cylinder out of a preset spaced longitudinal relationship within the handgrip.

11. A wheelchair as set forth in claim 10 wherein said locking mechanism is a spring biased detent.

12. A wheelchair as set forth in claim 11 wherein said spring biased detent is formed by a roller ball which seats itself in a groove formed in one of the first or second cylinders.

13. A wheelchair having a frame assembly comprising a seat frame member and a cross frame member, and a height or angle adjustment assembly which provides for an adjustable position between said seat frame member and said cross frame member and which comprises:

a handgrip having a longitudinal recess having a first end with a first set of internal threads and a second end with a second set of internal threads, and a first cylindrical member with a first set of external diameter threads and a second hollow cylindrical member with a second set of external diameter threads, and said first cylindrical member can be moved into a telescoping relationship with said second cylindrical member by rotating the handgrip to draw the first and the second cylindrical members together.

14. A wheelchair as set forth in claim 13 wherein the turnbuckle assembly further includes a safety that prohibits the cylindrical members from being overextended.

15. A wheelchair as set forth in claim 14 wherein the safety is a snap button which projects radially outward from the smaller diameter cylinder.

16. A wheelchair as set forth in claim 15 wherein the handgrip includes a longitudinal recess which includes the first and second threads and one of the set of threads has a smaller diameter so that a transition area between the first and the second set of threads forms an annular shoulder that motes with the snap button to form a stop.

17. A wheelchair as set forth in claim 16 wherein the snap button has a cammed surface that is biased inward when the smaller diameter cylinder telescopes inside of the larger diameter cylinder.

18. A wheelchair as set forth in claim 17 further including a locking mechanism that resists forces tending to move the first and second cylinder out of a preset spaced longitudinal relationship within the handgrip.

19. A wheelchair as set forth in claim 18 wherein said locking mechanism is a spring biased detent.

20. A wheelchair as set forth in claim 19 wherein said spring biased detent is formed by a roller ball which seats itself in a groove formed in one of the first or second cylinders.

* * * * *